(12) United States Patent
Hawes et al.

(10) Patent No.: US 7,679,378 B2
(45) Date of Patent: Mar. 16, 2010

(54) DUAL FUNCTION CAPACITIVE SENSOR FOR SEAT OCCUPANT DETECTION

(75) Inventors: Kevin J. Hawes, Greentown, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 396 days.

(21) Appl. No.: 11/890,038

(22) Filed: Aug. 3, 2007

(65) Prior Publication Data

US 2009/0033078 A1    Feb. 5, 2009

(51) Int. Cl.
  *G01R 27/26* (2006.01)
(52) U.S. Cl. .............. 324/686; 324/661; 340/438; 280/735
(58) Field of Classification Search .......... 324/686, 324/661; 340/425.5, 438; 280/735
See application file for complete search history.

(56) References Cited

U.S. PATENT DOCUMENTS

| | | | |
|---|---|---|---|
| 6,283,504 B1 | 9/2001 | Stanley et al. | |
| 6,329,913 B1 | 12/2001 | Shieh et al. | |
| 6,356,187 B2 | 3/2002 | Jinno et al. | |
| 6,442,464 B2 | 8/2002 | Eisenmann et al. | |
| 6,499,359 B1 | 12/2002 | Washeleski et al. | |
| 6,684,973 B2 | 2/2004 | Baba et al. | |
| 6,703,845 B2 | 3/2004 | Stanley et al. | |
| 6,927,678 B2 * | 8/2005 | Fultz et al. | 340/438 |
| 2004/0075259 A1 | 4/2004 | Baba et al. | |
| 2005/0128082 A1 * | 6/2005 | Stanley et al. | 340/561 |
| 2007/0159178 A1 * | 7/2007 | Stanley et al. | 324/457 |

OTHER PUBLICATIONS

U.S. Appl. No. 11/706,016, Hawes et al.

* cited by examiner

*Primary Examiner*—Vincent Q Nguyen
(74) *Attorney, Agent, or Firm*—Thomas N. Twomey

(57) ABSTRACT

A dual function capacitive occupant detection sensor includes a capacitive load cell disposed below a seat cushion, an electric field emitter disposed above the seat cushion and a capacitance-responsive control circuit. The control circuit determines a seated weight of an occupant based on the load cell capacitance, and a coupling of the electric field through an occupant based on the capacitance between the electric field emitter and the vehicle ground. The measured seated weight and electric field coupling parameters are logically combined to detect an occupant and to distinguish between a normally seated occupant and a cinched down infant or child seat of similar apparent weight.

6 Claims, 3 Drawing Sheets

DUAL FUNCTION CAPACITIVE SENSOR FOR SEAT OCCUPANT DETECTION

TECHNICAL FIELD

The present invention is directed to a capacitive sensor disposed in a seat for detecting a seat occupant.

BACKGROUND OF THE INVENTION

Seat occupant detection is frequently used in connection with air bags and other pyrotechnically deployed restraints as a means of determining if the restraints should be deployed in the event of sufficiently severe crash. A significant challenge arises from the desire to minimize the cost-impact of occupant detection while retaining the ability to distinguish between a normally seated occupant and an infant or child seat that is cinched down against the seat with a seat belt. Unfortunately, the most cost effective sensing approaches such as seated weight sensing cannot reliably discriminate between these two types of occupants because they have similar apparent weight. While it is certainly possible to equip the vehicle with two or more different types of sensors and discriminate between occupant types based on all of the sensor data, the cost of doing so is usually too high. Accordingly, what is needed is a cost-effective occupant detection sensor that can reliably distinguish between a normally seated occupant and a cinched down infant or child seat.

SUMMARY OF THE INVENTION

The present invention is directed to a dual function capacitive occupant detection sensor for a vehicle seat having a bottom seat cushion, the sensor including a capacitive load cell disposed adjacent a lower surface of the seat cushion, an electric field emitter disposed in a seating area of the seat adjacent an upper surface of the seat cushion and a capacitance-responsive control circuit. The control circuit determines a seated weight of an occupant based on the load cell capacitance, and a coupling of the electric field through an occupant based on the capacitance between the electric field emitter and the vehicle ground. The measured seated weight and electric field coupling parameters are logically combined to detect an occupant and to distinguish between a normally seated occupant and a cinched down infant or child seat of similar apparent weight.

DESCRIPTION OF THE PREFERRED EMBODIMENT

The dual function capacitive sensor of the present invention is disclosed herein in the context of an apparatus for detecting an occupant of a vehicle seat. However, it should be understood that the disclosed apparatus may be used in other environments, both vehicular and non-vehicular.

Figure 1:
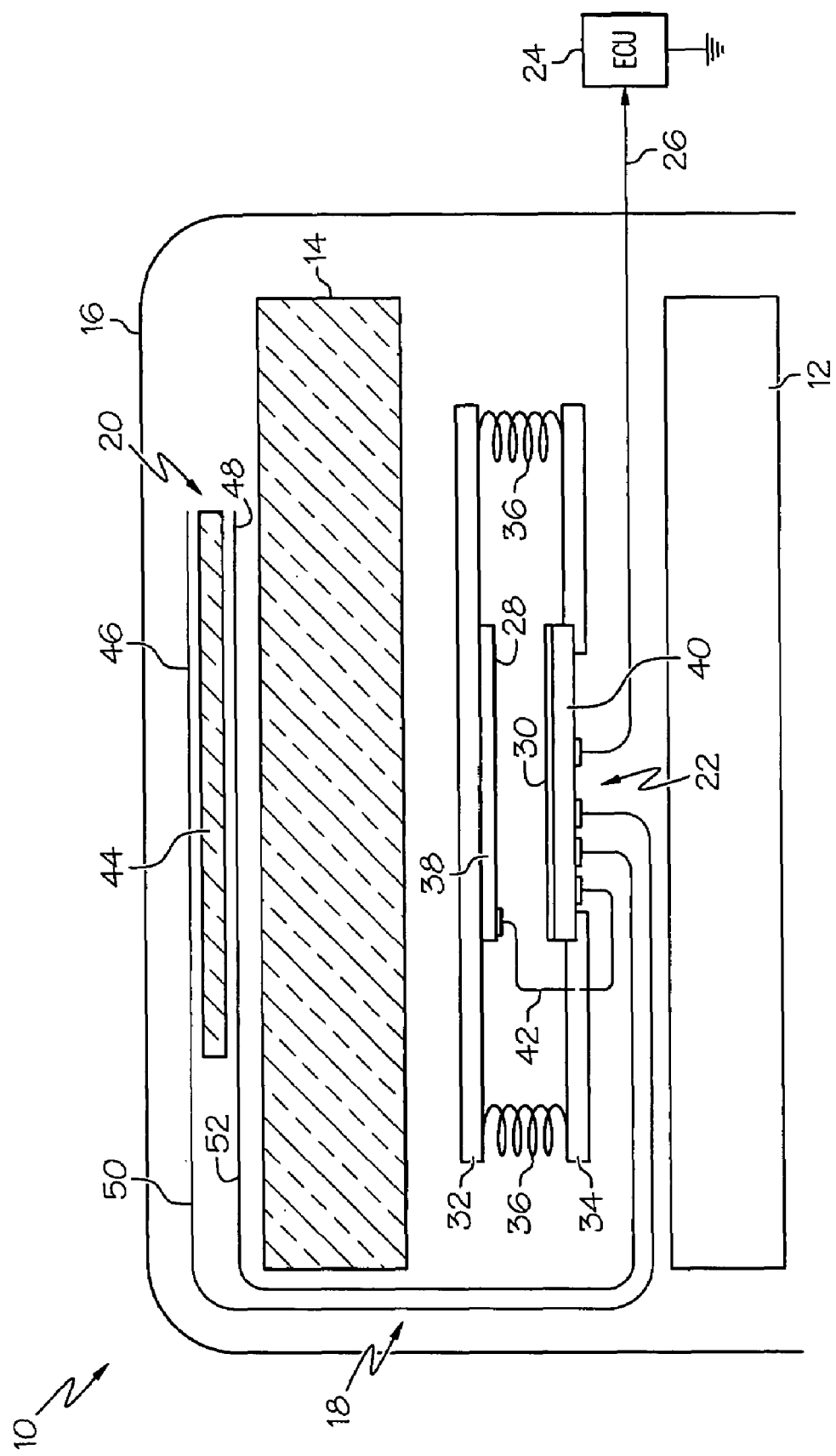
FIG. 1 diagrammatically depicts a vehicle seat equipped with a dual function capacitive sensor according to this invention.

Referring to FIG. 1, the reference numeral 10 generally designates a seat equipped with a dual function capacitive sensor according to this invention. The seat components include a frame 12, a foam cushion 14, and a leather or fabric seat cover 16. The sensor apparatus includes a module 18 disposed between the seat frame 12 and a foam cushion 14, and a coil mat 20 disposed between the foam cushion 14 and the seat cover 16 in a seating area of the seat 10. The module 18 includes a control circuit 22 that is coupled to an electronic control unit (ECU) 24 by an electrical cable 26. In a typical installation, the ECU 24 is an airbag control unit. Of course, the module 18 and coil mat 20 may be considerably smaller than shown in the illustration, if desired.

The module 18 defines a capacitive load sensor for detecting occupant weight applied to the seat 10, including first (upper) and second (lower) conductor plates 28 and 30 separated by a distance that decreases as occupant weight is applied to seat 10. The control circuit 22 is coupled to the conductor plates 28 and 30, and measures the capacitance between them to determine the occupant's seated weight. Mechanically, the upper and lower conductor plates 28 and 30 are respectively affixed to upper and lower force translation plates 32 and 34. Force translation plates 32 and 34 are preferably constructed of molded plastic, but may alternately be constructed of a non-insulative rigid material such as stamped sheet metal, provided the conductor plates 28 and 30 are suitably insulated. The force translation plates 32 and 34 are joined in a manner to maintain the conductor plates 28 and 30 substantially parallel to each other while permitting relative movement of either force translation plate 32, 34 in a mutually perpendicular direction within a predefined limits. A set of springs 36 distributed around the conductor plates 28 and 30 bias the force translation plates 32 and 34 apart within in limited range of movement, and compress to reduce the conductor plate separation distance when sufficient occupant weight is applied to the seat 10. The parameters of springs 36 are selected to achieve a desired force vs. deflection characteristic by setting both the spring pre-load (i.e., the spring bias force at the maximum separation distance of force translation plates 32 and 34) and the spring rate (i.e., the force vs. deflection relationship for occupant weight/force in excess of the pre-load bias force).

In the illustrated embodiment, the upper conductor plate 28 is formed the inboard face of a single-sided printed circuit board 38 that is affixed to the inboard face of upper force translation plate 32 by an adhesive, for example. The lower conductor plate 30 is formed on the inboard face of a double-sided circuit board 40 that is received within a central opening in lower force translation plate 34, and the control circuit 22 is disposed on the opposite or outboard face of circuit board 40. The single-sided printed circuit board 38 is provided with a lead wire 42 that is electrically tied to the upper conductor plate 28, and the lead wire 42 is routed through an opening in lower force translation plate 34 and to an electrical terminal of the control circuit 22.

The coil mat 20 includes an insulative mat 44, an upper flat spiral wire coil 46 attached to an upper face of mat 44, and a lower flat spiral wire coil 48 attached to the lower face of mat 44. For example, the insulative mat 44 may be a felt fabric, and the wire coils 46 and 48 may be sewn to the upper and lower surfaces of the felt fabric. The coils 46 and 48 are coupled to the control circuit 22 of module 18 via lead wires 50 and 52, and control circuit 22 applies identical AC signals to both coils 46 and 48. The AC signal applied to the upper coil 46 emits an electric field in close proximity to an occupant sitting on the seat 10, and the AC signal applied to lower coil 48 effectively shields the electric field from objects (such as foam cushion 14) disposed below the lower coil 48. The seated occupant, if present, couples the electric field to a ground reference of the vehicle, and the control circuit 22 measures the capacitance between the upper coil 46 and the vehicle ground to provide an indication of the electric field coupling for detecting the presence of a seated occupant.

Once the cable 26 and the lead wires 42, 50 and 52 have been attached to control circuit 22, potting material (not shown) may be dispensed onto the exposed face of circuit board 40 within the force translation plate aperture. When cured, the potting material seals control circuit 22 and secures the circuit board 40 to the lower force translation plate 34.

Figure 2:
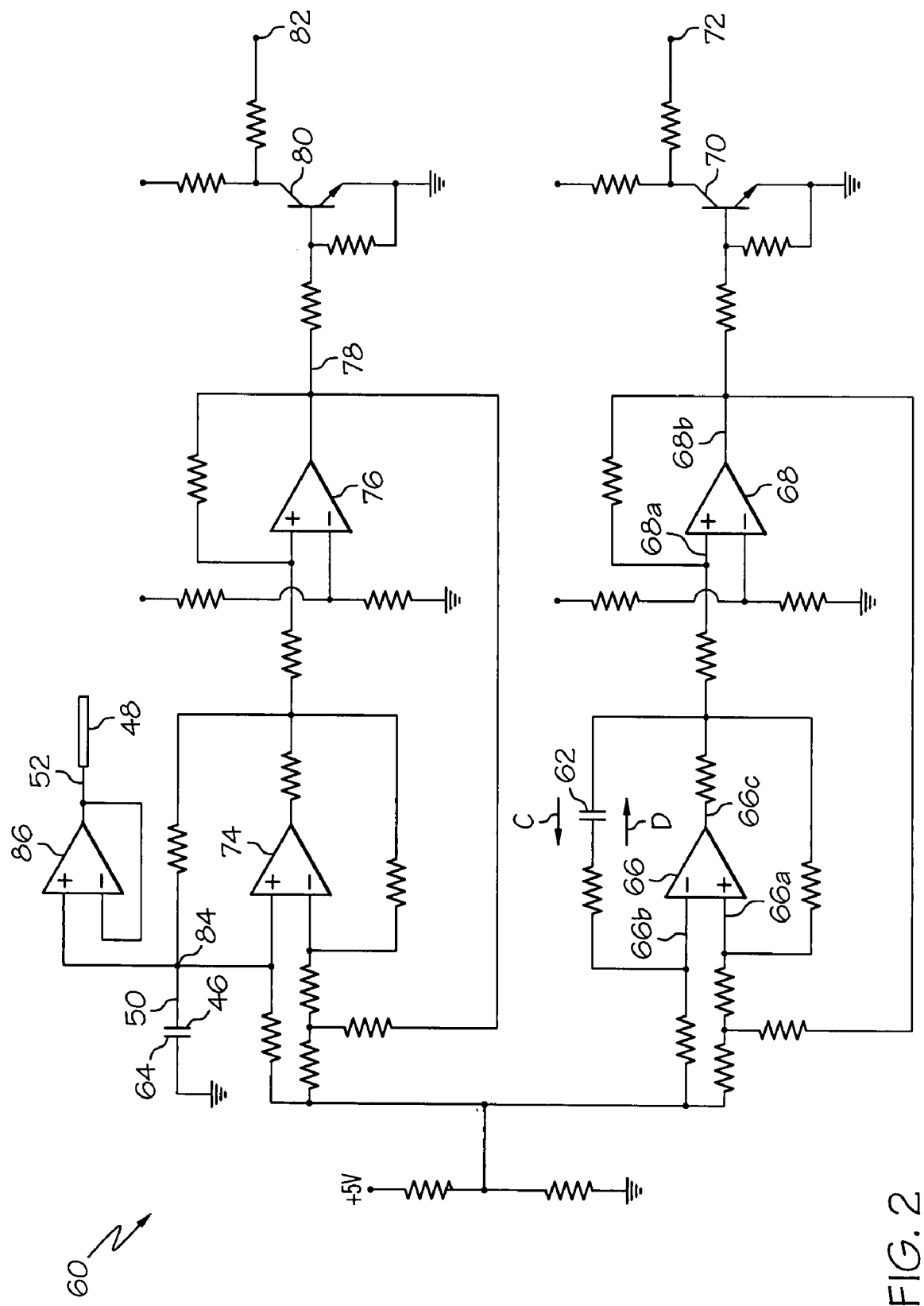
FIG. 2 is a schematic diagram of a control circuit incorporated into the dual function capacitive sensor of FIG. 1.

Referring to FIG. 2, reference numeral 60 generally designates a diagram of the control circuit 22 formed on the outboard face of circuit board 40. The control circuit 60 is designed to measure a first capacitance between the conductor plates 28 and 30, and a second capacitance between the spiral coil 46 and the circuit ground potential. The capacitance between conductor plates 28 and 30 will vary depending on their separation distance, as mentioned above. For example, the capacitance may have a relatively low value such as 5 pF when the seat 10 is unoccupied, and a relatively high value such as 25 pF when the seated weight of an occupant is sufficient to fully compress the springs 36. The capacitance between spiral coil 46 and ground potential varies depending on the degree of electric field coupling between spiral coil 46 and ground. When seat 10 is unoccupied, there is minimal coupling, and the measured capacitance will have a relatively low value such as 10 pF. When the seat 10 is occupied by a normally seated person, the coupling increases significantly, and the measured capacitance will have a relatively high value such as 150 pF. When the seat 10 is occupied by a cinched down child seat, the coupling is similar to that of an unoccupied seat. Of course, the capacitance value for an unoccupied seat may be determined from time to time whenever the seat 10 is unoccupied (as determined, for example, by the capacitive load cell measurement).

In the schematic diagram of FIG. 2, the gap capacitance between the conductor plates 28 and 30 is represented by the capacitor 62; and the gap capacitance between spiral coil 46 and ground potential is represented by the capacitor 64.

The capacitance of capacitor 62 is evaluated by a constant current source formed by operational amplifier 66, configured as a voltage-to-current converter. A high control voltage applied to the amplifier's non-inverting input 66a will exceed a reference voltage applied to the amplifier's inverting input 66b; in this case the amplifier's output 66c is driven to a high state, and a charging current flows through capacitor 62 as indicated by arrow C. Conversely, a low control voltage at the non-inverting input 66a drives the output 66c to a low state, and a discharging current flows through capacitor 62 as indicated by arrow D. The amplifier's output 66c is applied to the non-inverting input 68a of comparator 68 so that its output 68b transitions from high to low with the charging and discharging of capacitor 62. The comparator 68 also has hysteresis to allow output voltage operation of amplifier 66 from 2 to 4 volts. The square-wave output voltage of comparator 68 regulates the control voltage applied to the non-inverting input 66a of amplifier 66, resulting in cyclical charging and discharging of capacitor 62. The comparator output 68 is also coupled to the base of transistor 70 to provide a corresponding output at terminal 72, which is supplied to ECU 24 via cable 26.

The signal at the output 66c of amplifier 66 is a triangular waveform due to the cyclical charging and discharging of capacitor 62. Since the charge and discharge rates vary with the capacitance of capacitor 62, the frequency of the waveform provides a measure of the capacitance—that is, the gap capacitance between conductor plates 28 and 30. ECU 24 determines the frequency by measuring the period of the signal over at least one complete cycle.

In a similar manner, operational amplifier 74 and comparator 76 determine the capacitance of capacitor 64. The cyclical charging and discharging the capacitor 64 produces a square-wave output voltage on line 78 having a frequency that provides a measure of the capacitance. And the transistor 80 provides a corresponding output signal at terminal 82 for ECU 24. The AC signal applied to the spiral coil 46, that is, the signal at circuit node 84, is picked off by a unity-gain amplifier 86 and applied to lead wire 52 of spiral coil 48 to shield the electric field emitted by spiral coil 46 as explained above.

Figure 3:
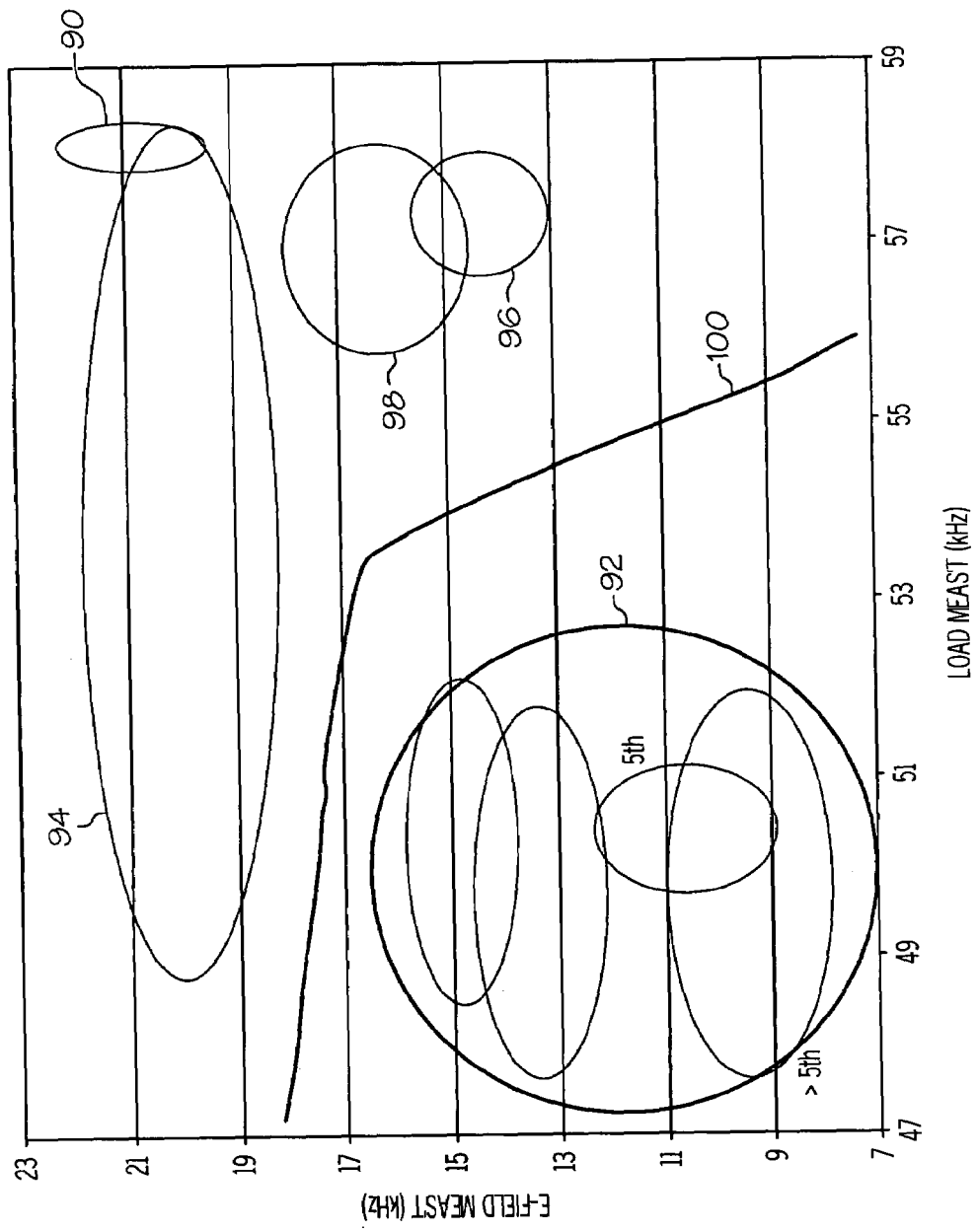
FIG. 3 is a graphical representation of data obtained from the dual function capacitive sensor of FIG. 1 under a variety of conditions.

The graph of FIG. 3 summarizes data obtained from the dual function sensor apparatus of FIG. 1 for an unoccupied seat and for different types seat occupants. The horizontal axis represents the output frequency in kHz at circuit terminal 72; the frequency increases from left to right with decreasing seat force and decreasing capacitance of capacitor 62. The vertical axis represents the output frequency in kHz at circuit terminal 82; the frequency increases from bottom to top with decreasing electric field coupling and decreasing capacitance of capacitor 64.

An unoccupied seat is characterized by low electric field coupling and minimal seat force; and the data under such conditions falls into the region designated by the reference numeral 90. A seat occupied by a normally seated adult is characterized by high electric field coupling and relatively high seat force; and the data under such conditions falls into the region designated by the reference numeral 92. Variability within the region 92 occurs with variations in occupant weight, height, clothing and posture. A seat occupied by a cinched down infant or child seat is characterized by low electric field coupling similar to an unoccupied seat and seat force that varies depending on how tightly the infant or child seat is cinched; and the data under such conditions falls into the region designated by the reference numeral 94. While there is some overlap in seat force between a cinched infant or child seat (region 94) and a normally seated adult (region 92), the difference in electric field coupling is more than sufficient for reliable discrimination between the two occupant categories. Finally, the regions 96 and 98 represent data obtained when the seat is occupied by a normally seated child; region 96 represents a child seated directly on the seat cover 16, while region 98 represents a child seated on a blanket draped over the seat cover 16. While there is some overlap in electric field coupling between a normally seated child (regions 96 or 98) and a normally seated adult (region 92), the difference in seat force is more than sufficient for reliable discrimination between the two occupant categories.

A typical control strategy for supplemental inflatable restraints is to enable deployment for a particular seating location when the seat is occupied by an adult, and to inhibit deployment when the seat is unoccupied or occupied by a normally seated child or by a child or infant seat. Thus, ECU 24 executes an enable/inhibit algorithm that samples the seat force and the electric field coupling based on the sensor signals at circuit terminals 72 and 82, and decides whether to allow or inhibit deployment based on the data. The decision to allow or inhibit may be arrived at by defining a threshold such as represented by the trace 100 in FIG. 3. If the seat force vs. electric field coupling data falls to the right of threshold 100, deployment is inhibited because the seat is unoccupied or occupied by a normally seated child or by a child or infant seat. If the seat force vs. electric field coupling data falls to the left of threshold 100, deployment is enabled because the seat is occupied by an adult.

In summary, the present invention provides a cost-effective dual function occupant detection sensor that can reliably distinguish between a normally seated occupant and a cinched down infant or child seat. While the sensor apparatus has been described in reference to the illustrated embodiment, it should be understood that various modifications in addition to those mentioned above will occur to persons skilled in the art. For example, the capacitance may be measured differently than described herein, the sensor may be applied to the seat back instead of or in addition to the seat bottom, the employ/inhibit algorithm may be implemented by control circuit 22, and so on. Accordingly, it is intended that the invention not be limited to the disclosed embodiment, but that it have the full scope permitted by the language of the following claims.

The invention claimed is:

1. A dual function capacitive sensor apparatus for detecting an occupant of a seat, the seat including a foam cushion supported on a frame and covered with a seat cover, the sensor apparatus comprising:
    a capacitive load cell disposed between the foam cushion and the frame, including upper and lower conductive plates biased apart by a resilient member that compresses to reduce a separation distance between said conductive plates in response to force applied to the seat by the occupant;
    an electric field emitter disposed between the foam cushion and the seat cover in a seating area of said seat;
    a capacitance-responsive control circuit coupled to both the capacitive load cell and the electric field emitter for determining (1) a seated weight of the occupant based on a first capacitance between said upper and lower conductive plates, and (2) an electric field coupling of the occupant based on a second capacitance between the electric field emitter and a ground reference; and
    a control unit coupled to the capacitance-responsive control circuit for detecting the occupant based on the determined seated weight and the determined electric field coupling; wherein said electric field emitter includes an insulative mat, a first conductor disposed on an upper surface of said insulative mat adjacent said seat cover, and a second conductor disposed on a lower surface of said insulative mat adjacent said foam cushion: and said control circuit applies substantially identical AC signals to the first and second conductors.

2. The sensor apparatus of claim 1, further comprising:
    a module disposed between the foam cushion and the frame, where the module houses the capacitive load cell and the capacitance-responsive control circuit, and is coupled to the electric field emitter by at least one lead wire routed around the foam cushion.

3. The sensor apparatus of claim 1, where:
    the first and second conductors are flat spiral wire coils.

4. The sensor apparatus of claim 3, where:
    the insulative mat is a fabric, and the first and second conductors are sewn onto the upper and lower surfaces of said insulative mat.

5. The sensor apparatus of claim 1, where:
    said control unit discriminates between a normally seated adult occupant and a cinched down infant or child seat of similar apparent weight based on the determined electric field coupling.

6. The sensor apparatus of claim 1, where:
    said control unit discriminates between a normally seated adult occupant and a normally seated child occupant exhibiting similar electric field coupling based on the determined seated weight.

* * * * *